United States Patent [19]

Kitahara et al.

[11] Patent Number: 5,544,527

[45] Date of Patent: Aug. 13, 1996

[54] FLOW METER HAVING A MAIN PASSAGE AND A BRANCH PASSAGE PARTIALLY PARTITIONED INTO PLURAL REGIONS

[75] Inventors: Noboru Kitahara, Kariya; Minoru Kondo, Chiryu; Yukio Sawada, Anjo, all of Japan

[73] Assignee: Nippondenso Co., Ltd., Kariya, Japan

[21] Appl. No.: 363,006

[22] Filed: Dec. 23, 1994

[30] Foreign Application Priority Data

Dec. 24, 1993 [JP] Japan .................................. 5-328646

[51] Int. Cl.$^6$ ....................................................... G01F 1/68
[52] U.S. Cl. ..................................... 73/204.21; 73/204.23
[58] Field of Search .......................... 73/204.21, 204.16, 73/204.23, 204.19, 118.2

[56] References Cited

U.S. PATENT DOCUMENTS

| | | | |
|---|---|---|---|
| 4,599,895 | 7/1986 | Wiseman | 73/204.21 |
| 5,083,455 | 1/1992 | Saito et al. | 73/204.21 |
| 5,209,113 | 5/1993 | Sawada et al. | 73/204.21 |
| 5,325,712 | 7/1994 | Tsutsui et al. | 73/118.2 |

FOREIGN PATENT DOCUMENTS 55-28980  2/1980  Japan .
56-108910  8/1981  Japan .

*Primary Examiner*—Richard Chilcot
*Assistant Examiner*—Max Noori
*Attorney, Agent, or Firm*—Cushman Darby & Cushman, L.L.P.

[57] ABSTRACT

A flow meter includes a tubular member having a main passage in which fluid flows. A branch passage member disposed in the main passage has a branch passage in which the fluid flows. A support member connects the branch passage member and a wall of the tubular member, and supports the branch passage member within the main passage. A partition arrangement disposed in the branch passage divides the branch passage into a plurality of sub passages extending along a flow of the fluid. A flow-rate measuring resistor is disposed in a region of the branch passage downstream of the partition arrangement for sensing a rate of a flow of the fluid in the branch passage. A control circuit electrically connected to the flow-rate measuring resistor is operative for calculating a measurement value from an output signal of the flow-rate measuring resistor. An outlet formed in the branch passage member is operative for connecting the branch passage with the main passage to enable the fluid to move from the branch passage into the main passage after the fluid meets the flow-rate measuring resistor. The partition arrangement includes a partition plate. A length of a part of the partition plate, measured along a direction of the fluid flow, depends on a position of the part.

7 Claims, 4 Drawing Sheets

AIR FLOW DIRECTION

FLOW METER HAVING A MAIN PASSAGE AND A BRANCH PASSAGE PARTIALLY PARTITIONED INTO PLURAL REGIONS

BACKGROUND OF THE INVENTION

1. Field of the Invention

This invention relates to a flow meter such as a device for detecting the rate of a flow of fluid. This invention relates to, for example, an air flow meter provided in an air induction passage of and internal combustion engine.

2. Description of the Prior Art

Recently, some engines have been subjected to microcomputer-based general control to improve their performances. In the case of automotive engines, general engine control includes control of the A/F (air-to-fuel) ratio of an air-fuel mixture supplied to the engines and control of the rate of the fuel injection into the engines.

Usually, the A/F ratio control and the fuel injection rate control require information of the rate of the flow of air drawn into the engines. In typical cases, air flow meters disposed in air induction passages of the engines detect the rate of the air flow into the engines. Output signals of such air flow meters are used in the A/F ratio control and the fuel injection rate control as an indication of the rate of the air flow into the engines.

Some of air flow meters use a flow sensor of the hot-wire type. Usually, hot-wire flow sensors are advantageous in cost as well as dynamic range.

A prior-art air flow meter of the hot-wire type has a cylindrical casing formed with a main air passage and a sub or branch air passage which by-passes the main air passage. The cross sectional area of the main passage and the cross sectional area of the branch passage are in a predetermined relation so that the rate of the air flow through the branch passage has a given relation with the rate of the air flow through the main passage. Accordingly, only the rate of the air flow through the branch passage is detected, and the sum of the rates of the air flows through the main passage and the branch passage is estimated from the detected air flow rate related to the branch passage.

Regarding the prior-art air flow meter, a hot-wire resistor for measuring an air flow rate is disposed in the branch passage. A resistor for temperature compensation is also disposed in the branch passage. The two resistors extend parallel to each other but occupy different places as viewed in the direction of the air flow. The two resistors are electrically connected to a control circuit via leads.

In the prior-art air flow meter, the hot-wire resistor is exposed to only the air flow in the branch passage. Therefore, the prior-art air flow meter is advantageous in preventing the hot-wire resistor from being contaminated by dust in air. In the case of automotive use, the prior-art air flow meter follows an air cleaner element in the direction of the air flow. The design including the branch passage is effective in reducing a disturbance in the velocity distribution of the air flow which is caused by the air cleaner element.

In the prior-art air flow meter, it is difficult to completely remove such a disturbance from the velocity distribution of the air flow. In addition, it is difficult to remove pulsations from the air flow which are caused by operation of a related automotive engine.

In automotive engines, a backfire tends to occur when an ignition timing is excessively earlier than the normal timing. During the occurrence of a backfire, shock wave caused by a high pressure and a high temperature in engine cylinders travels back toward an upstream side of a related engine. The hot-wire resistor in the prior-art air flow meter tends to be damaged or deformed by backfire shock wave. In addition, dust on the hot-wire resistor is burned by a backfire and the resultant material is closely fixed to the hot-wire resistor so that the hot-wire resistor is deteriorated.

Japanese published unexamined patent application 56-108910 discloses an advanced air flow meter provided with an air flow buffer extending upstream of a hot-wire resistor but downstream of an air cleaner element. The air flow buffer reduces disturbances and pulsations in an air flow which meets the hot-wire resistor. The air flow buffer includes a stainless steel mesh or a ceramic honeycomb. Generally, the air flow buffer effectively damps backfire shock wave which travels between the engine and the air cleaner element. Accordingly, the air flow buffer protects the hot-wire resistor from the backfire shock wave.

In a range around a certain point of the air flow rate, the value represented by the output signal of the air flow meter of Japanese application 56-108910 tends to vary discontinuously as a function of the air flow rate.

SUMMARY OF THE INVENTION

It is an object of this invention to provide an improved flow meter.

A first aspect of this invention provides a flow meter comprising a tubular member having a main passage in which fluid flows; a branch passage member disposed in the main passage and having a branch passage in which the fluid flows; a support member connecting the branch passage member and a wall of the tubular member, and supporting the branch passage member within the main passage; a partition arrangement disposed in the branch passage and dividing the branch passage into a plurality of sub passages extending along a flow of the fluid; a flow-rate measuring resistor disposed in a region of the branch passage downstream of the partition arrangement for sensing a rate of a flow of the fluid in the branch passage; a control circuit electrically connected to the flow-rate measuring resistor for calculating a measurement value from an output signal of the flow-rate measuring resistor; and an outlet formed in the branch passage member for connecting the branch passage with the main passage to enable the fluid to move from the branch passage into the main passage after the fluid meets the flow-rate measuring resistor; wherein the partition arrangement comprises a partition plate, and a length of a part of the partition plate, measured along a direction of the fluid flow, depends on a position of the part.

It is preferable that the partition plate has a downstream end formed with a step, and the downstream end has a projecting portion and a recessed portion.

It is preferable that the projecting portion and the recessed portion are of a rectangular wave shape.

It is preferable that a cross-section of the partition plate, which is taken along a flat plane parallel to the direction of the air flow, has a streamline shape.

A second aspect of this invention provides a hot-wire air flow meter for measuring a rate of an air flow in an air passage which comprises means for dividing the air passage into a main passage and a sub passage; a partition arrangement disposed in the sub passage and dividing the sub passage into a plurality of passages; and a hot-wire sensor disposed in a region of the sub passage downstream of the partition arrangement; wherein the partition arrangement comprises a partition plate, and a length of a part of the partition plate, measured along a direction of the fluid flow, varies as the part moves from an outer portion of the sub passage toward a center of the sub passage.

It is preferable that the partition plate has a downstream end formed with a step.

DESCRIPTION OF THE PREFERRED EMBODIMENTS

First Embodiment

Figure 1:
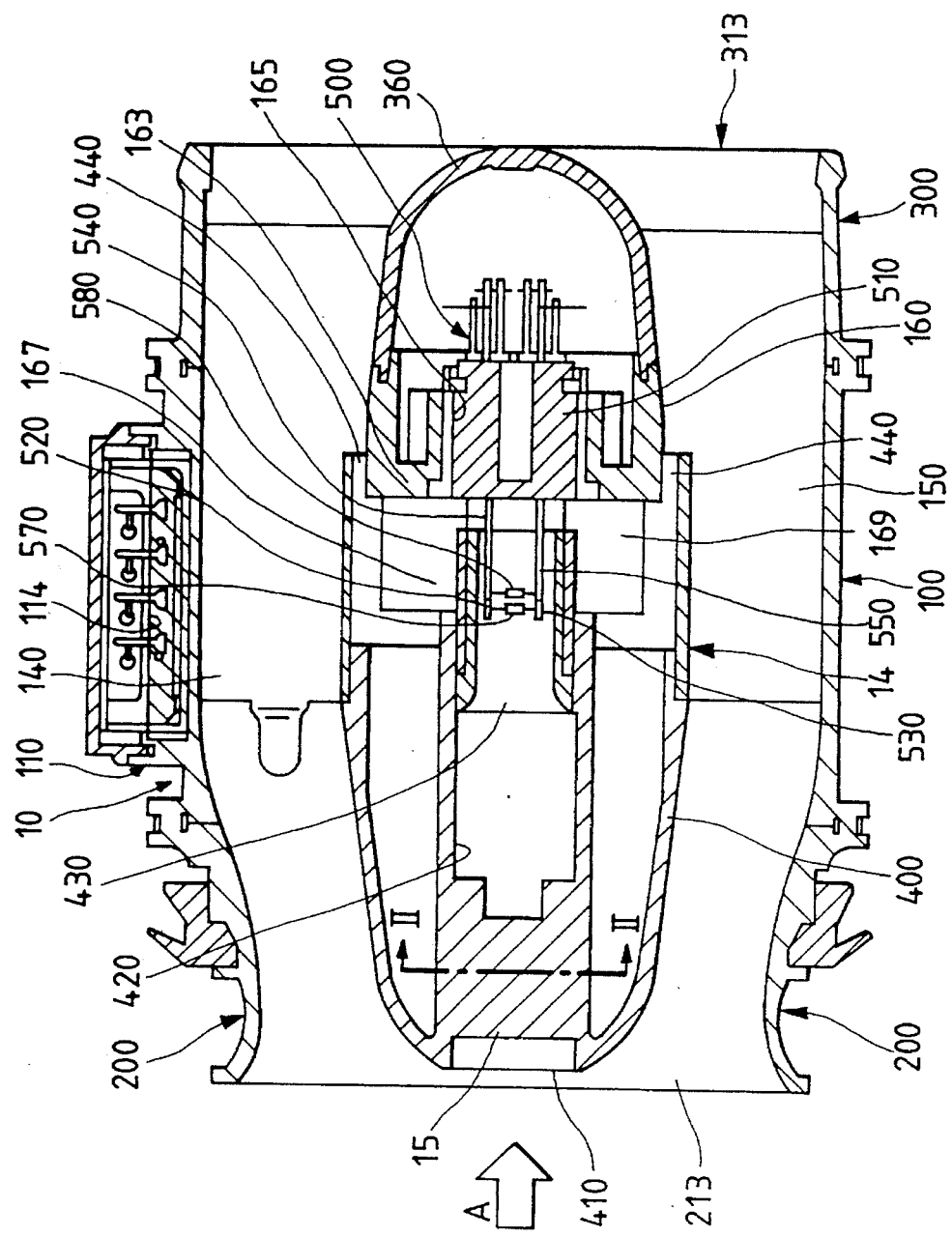
FIG. 1 is a sectional view of a flow meter according to a first embodiment of this invention.

With reference to FIG. 1, an air flow meter 10 includes a body having an upstream end and a downstream end. The upstream end of the body of the air flow meter 10 is formed with an upstream opening 213. The upstream end of the body of the air flow meter 10 is inserted into an air cleaner (not shown), and is connected thereto. The downstream end of the body of the air flow meter 10 is formed with a downstream opening 313, and is inserted into an air induction duct (not shown) leading to an engine (not shown). A belt (not shown) extending around the air induction duct fastens the air induction duct to the downstream end of the body of the air flow meter 10.

The air flow meter 10 includes a barrel composed of an upstream section 200, an intermediate section or a central section 100, and a downstream section 300 sequentially and coaxially connected to each other. The upstream barrel 100, the intermediate barrel 100, and the downstream barrel 300 define an air passage therein.

The air flow meter 10 includes an oval (egg-shaped) central member 14 disposed coaxially in the air passage. As will be made clear later, the air flow meter 10 has an air passage therein which is divided into a main air passage and a sub air passage (branch air passage). The main air passage is defined between the central member 14 and the outer shell of the air flow meter 10. The sub air passage, that is, the branch air passage, extends in the central member 14. The central member 14 has a housing composed of an upstream section 400, an intermediate section 160, and a downstream section 360 sequentially and coaxially connected to each other.

The central barrel 100 is made of, for example, resin. A container 110 is formed integrally with an outer portion of the central barrel 100. The container 110 accommodates a control circuit 114 for a hot-wire sensor portion 500 which will be described later. The circuit container 110 is provided with a lid (no reference numeral).

The central barrel 100 has cylindrical inner surfaces. The central barrel 100 has a plurality of ribs including ribs 140 and 150. These ribs are integrally formed with a major part of the central barrel 100. The ribs (including the ribs 140 and 150) extend radially inward from the inner surfaces of the central barrel 100. It is preferable that the ribs are angularly spaced. The intermediate housing 160 of the central member 14 is formed integrally with inner ends of the ribs (including the ribs 140 and 150) so that the central member 14 is supported on the central barrel 100 by the ribs.

The upstream housing 400 of the central member 14 has a shape of a bullet. The upstream housing 400 is made of, for example, resin. The upstream housing 400 fits into the intermediate housing 160 of the central member 14, and is hence fixed thereto. A central part of a front end of the upstream housing 400 has an inlet opening 410 which is immediately followed by a partition arrangement 15. The inlet opening 410 forms an upstream end of the branch air passage. The partition arrangement 15 is formed integrally with the upstream housing 400. The partition arrangement 15 serves as both a heat exchanger and a flow adjuster. The partition arrangement 15 is also referred to as the heat exchanger member 15.

Figure 2:
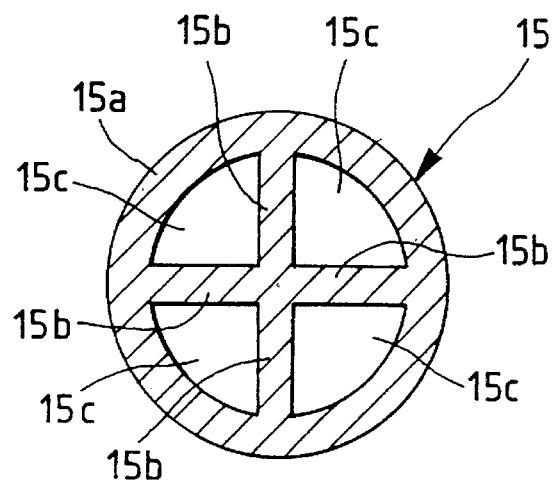
FIG. 2 is a sectional view of a partition arrangement taken along the line II—II in FIG. 1.

With reference to FIGS. 1 and 2, the partition arrangement 15 includes a cylindrical portion 15a coaxial with the upstream housing 400. The partition arrangement 15 also includes flat partition plates 15b extending parallel with the axis of the upstream housing 400. The partition plates 15b radially and inwardly extend from the cylindrical portion 15a, and meet at around the axis of the cylindrical portion 15a. The partition plates 15b are spaced by equal angular intervals of, for example, 90 degrees. In other words, adjacent twos of the partition plates 15b are perpendicular to each other. Accordingly, the cylindrical portion 15a and the partition plates 15b define axially-extending through-holes 15c which have, for example, a quadrant cross section. The through-holes 15c lead from the inlet opening 410, and form a part of the branch air passage. The through-holes 15c are directed approximately toward a heater 570 and a thermometer 580. Specifically, the axially-extending surfaces of the partition arrangement 15 which define the through-holes 15c are directed approximately toward the heater 570 and the thermometer 580.

The upstream housing 400 includes a cylindrical tube 420 coaxially following the partition arrangement 15 in the direction of an air flow. The cylindrical tube 420 has a passage therein which communicates with the through-holes 15c in the partition arrangement 15 and which forms a part of the branch air passage. The cylindrical tube 420 is formed integrally with the partition arrangement 15.

A cylindrical measurement tube 430 coaxially fits into a downstream end of the branch tube 420. The measurement tube 430 has a passage therein which forms a part of the branch air passage. The inner surfaces of the intermediate housing 160 are formed with radially-extending plate ribs including ribs 167 and 169. These ribs are spaced at equal angular intervals of, for example, 90 degrees. A downstream end of the measurement tube 430 contact upstream portions of the ribs (including the ribs 167 and 169) so that they are supported on the intermediate housing 160 by the ribs. It is preferable that the downstream edge of the branch tube 420 abuts against the upstream edges of the ribs (including the ribs 167 and 169). The ribs (including the ribs 167 and 169) provide given spacings between the downstream end of the measurement tube 430 and a cylindrical wall member 163 of the intermediate housing 160. These spacings form a part of the branch air passage, and extend between the downstream end of the measurement tube 430 and an outlet opening (or outlet openings) 440 provided in the walls of the intermediate housing 160. The outlet openings 440 form a downstream end of the branch air passage.

The outlet openings 440 communicate with a space between the intermediate housing 160 and the intermediate barrel 100 which forms a part of the main air passage. Thus, the downstream end of the branch air passage is connected to the main air passage via the outlet openings 440.

The cylindrical wall member 163 of the intermediate housing 160 has an axial bore 165 in which a cylindrical resin base 510 of the hot-wire sensor portion 500 is fixedly disposed. The hot-wire sensor portion 500 includes support pins 520, 530, 540, and 550 mounted on the resin base 510. The support pins 520, 530, 540, and 550 axially extend through the resin base 510, and project from both upstream and downstream ends of the resin base 510. The support pins 520 and 530 have longer portions projecting from the upstream end of the resin base 510 while the support pins 540 and 550 have shorter portions projecting from the upstream end of the resin base 510. The heater 570 is electrically connected and mechanically supported between ends of the longer pins 520 and 530. The heater 570 forms a resistor (hot-wire resistor) for measuring an air flow rate. The thermometer 580 is electrically connected and mechanically supported between ends of the shorter pins 540 and 550.

The heater 570 includes a ceramic bobbin, a platinum wire wound on the bobbin, and a pair of leads provided on the bobbin. Ends of the platinum wire are electrically connected to the leads for connection with the support pins 520 and 530. The platinum wire in the heater 570 constitutes a temperature-responsive resistor having predetermined characteristics (temperature response characteristics). Similarly, the thermometer 580 includes a ceramic bobbin, a platinum wire wound on the bobbin, and a pair of leads provided on the bobbin. Ends of the platinum wire are electrically connected to the leads for connection with the support pins 540 and 550. The platinum wire in the thermometer 580 constitutes a temperature-responsive resistor having predetermined characteristics (temperature response characteristics). It is preferable that the characteristics of the temperature-responsive resistor in the heater 570 are equal to the characteristics of the temperature-responsive resistor in the thermometer 580.

Electrical conductors (not shown) extend between the circuit container 110 and a space defined between the intermediate housing 160 and the downstream housing 360. The electrical conductors pass through the walls of the rib 140. First ends of the electrical conductors are connected to the control circuit 114 within the circuit container 110. Second ends of the electrical conductors are connected via a flexible wiring member (not shown) to ends of the support pins 520, 530, 540, and 550 which project from the downstream end of the resin base 510 of the hot-wire sensor portion 500. Therefore, the control circuit 114 within the circuit container 110 is electrically connected to the heater 570 and the thermometer 580.

The air flow meter 10 operates as follows. Air flows along the direction "A" of FIG. 1, and enters the air flow meter 10. A portion of the air flows via the inlet opening 410 into the branch air passage extending in the central member 14. A remaining portion of the air flows into the main air passage extending between the central member 14 and the outer shell of the air flow meter 10.

In the branch air passage, the air flows through the heat exchanger member 15 after passing through the inlet opening 410. In cases where the air has a disturbance in flow velocity, the disturbance is reduced and suppressed as the air flows through the holes 15c in the heat exchanger member 15. Thus, the air flow in the branch air passage is adjusted by the heat exchanger member 15.

The air flowing into the branch air passage tends to be exposed to an uneven temperature distribution caused by factors such as an uneven temperature distribution of the air cleaner. Such an uneven temperature distribution in the air might cause a temperature difference between the heater 570 and the thermometer 580 which would result in an error in the detection of an air flow rate by the air flow meter 10. Such an uneven temperature distribution in the air is reduced and suppressed by the heat exchanger member 15 as will be described below.

In the heat exchanger member 15, the through-holes 15c are defined between the cylindrical portion 15a and the partition plates 15b. The cylindrical portion 15a and the partition plates 15b are integral with the major part of the upstream housing 400 so that they are in a substantially uniform temperature distribution. The air in the through-holes 15c contacts the cylindrical portion 15a and the partition plates 15b via large areas so that efficient heat exchange can occur between the air in the through-holes 15c and the walls of the heat exchanger member 15. Therefore, an uneven temperature distribution in the air can be reduced and suppressed as the air passes through the heat exchanger member 15.

The through-holes 15c in the heat exchanger member 15 are directed approximately toward the heater 570 and the thermometer 580 so that the air will exit from the heat exchanger member 15 in directions toward the heater 570 and the thermometer 580. The air sequentially passes through the branch tube 420 and the measurement tube 430 after exiting from the heat exchanger member 15. The air meets the heater 570 and the thermometer 580 when flowing in the measurement tube 430.

It is preferable that the effective cross-sectional area of the branch air passage in the measurement tube 430 is smaller than the effective cross-sectional area of the branch air passage in the branch tube 420. In this case, the air flow in the branch air passage is further adjusted by the measurement tube 430. Portions of the air which meet the heater 570 and the thermometer 580 are substantially equal in temperature as a result of operation of the heat exchanger member 15. The effective cross-sectional area of the branch air passage in the measurement tube 430 is preferably chosen so as to provide an air flow velocity sufficient for measurement even when the engine operates in conditions requiring only a small air supply rate.

The heater 570 is heated by the control circuit 114 at a given temperature relative to the temperature of the air in the measurement tube 430. The heater 570, the thermometer 580, and the control circuit 114 cooperate to measure the rate (velocity) of the air flow in the measurement tube 430. The control circuit 114 outputs an electric signal representing the measured air flow rate. The output signal of the control unit 114 is fed to a fuel injection control device (not shown), and the measured air flow rate is used in determination of a target fuel injection rate.

After the air exits from the measurement tube 430, the air encounters the wall member 163 of the intermediate housing 160 and the resin base 510 of the hot-wire sensor portion 500 so that the direction of the air flow changes from the axial direction to the radial direction. Then, the air flows toward the outlet opening 440 and moves thereinto. The air passes through the outlet opening 440 and enters the main air passage extending between the central member 14 and the outer shell of the air flow meter 10.

The partition arrangement 15 will be further described. Downstream edges of the partition plates 15b have stepped configurations (see FIG. 1). An outer portion of each of the partition plates 15b is greater in axial length (axial dimension) than an inner portion thereof. In other words, the outer portion of each of the partition plates 15b is greater than the inner portion thereof in dimension along the direction of the air flow. Therefore, the air flow along the inner portions of the partition plates 15b and the air flow along the outer portions of the partition plates 15b are different from each other in transitional flow rate point at which a laminar flow is replaced by a turbulent flow. This design provides a wider transitional flow rate rage. As a result, the value represented by the output signal of the air flow meter 10 is hardly affected by an abrupt change in a resistance to the air flow. In addition, the value represented by the output signal of the air flow meter 10 is prevented from discontinuously varying as a function of the air flow rate. In other words, the output signal of the air flow meter 10 has a smooth relation with the air flow rate.

Figure 3:
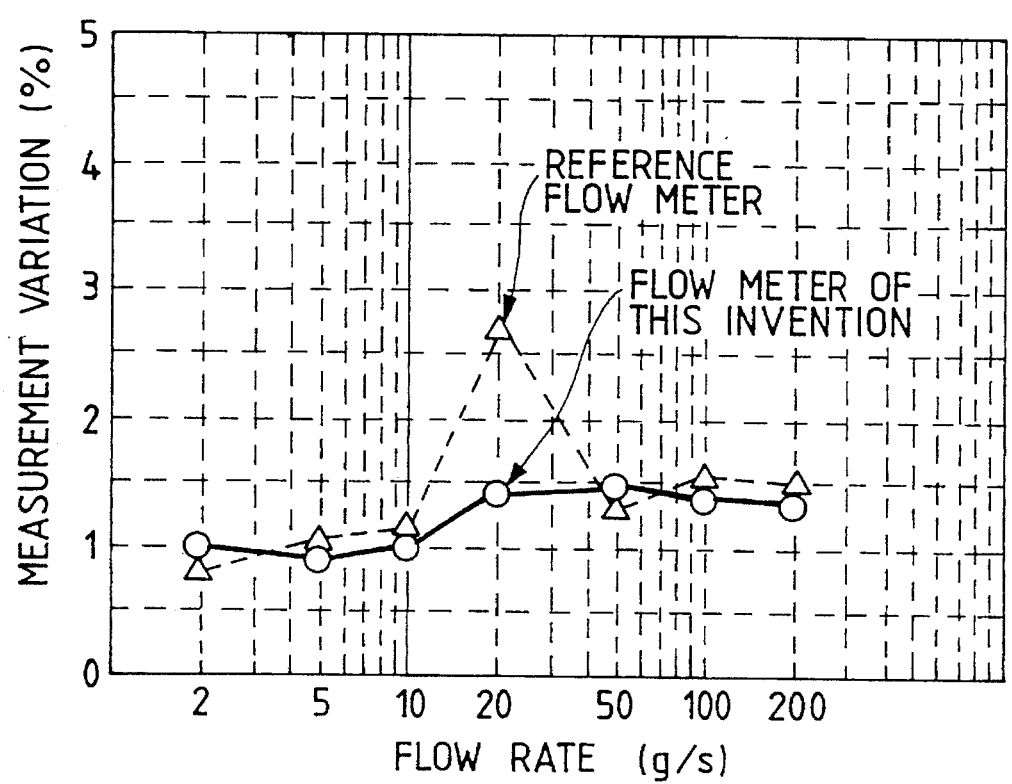
FIG. 3 is a diagram of the relation between a measurement variation and a flow rate regarding each of the flow meter of FIG. 1 and a reference flow meter.

Experiments were performed on the air flow meter 10 and a reference air flow meter. The reference air flow meter was similar to the air flow meter 10 except that downstream edges of partition plates 15b of a partition arrangement 15 were devoid of steps. During the experiments, a measurement variation of each of the air flow meter 10 and the reference air flow meter was monitored and plotted at different points of an air flow rate. FIG. 3 shows the experimentally-obtained relation between the measurement variation and the air flow rate regarding each of the air flow meter 10 and the reference air flow meter. As shown in FIG. 3, the air flow meter 10 was better than the reference air flow meter in the relation between the measurement variation and the air flow rate.

Second Embodiment

Figure 4:
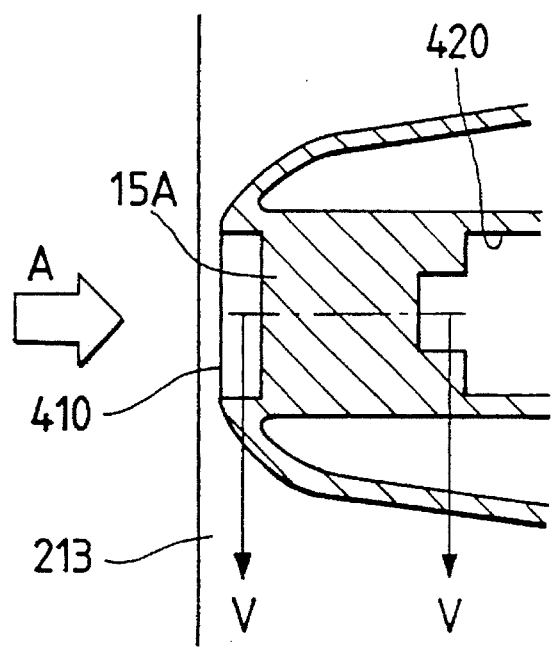
FIG. 4 is a sectional view of a portion of a flow meter according to a second embodiment of this invention.
Figure 5:
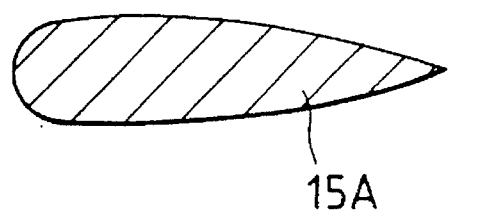
FIG. 5 is a sectional view of a partition arrangement taken along the line V—V in FIG. 4.

FIGS. 4 and 5 show a second embodiment of this invention which is similar to the embodiment of FIGS. 1–3 except that the partition arrangement 15 of FIGS. 1 and 2 is modified into a partition arrangement 15A.

A cross-section of each partition plate of the partition arrangement 15A, which is taken along a flat plane parallel to the direction of an air flow, has a streamline shape. The streamline shape enables even an air flow of a higher rate to move along the partition plate. Therefore, heat exchange can be more efficiently executed between air and the partition plate.

According to the embodiment of FIGS. 4 and 5, the partition arrangement 15A can execute sufficient heat exchange in a wide rage of the air flow rate.

Third Embodiment

Figure 6:
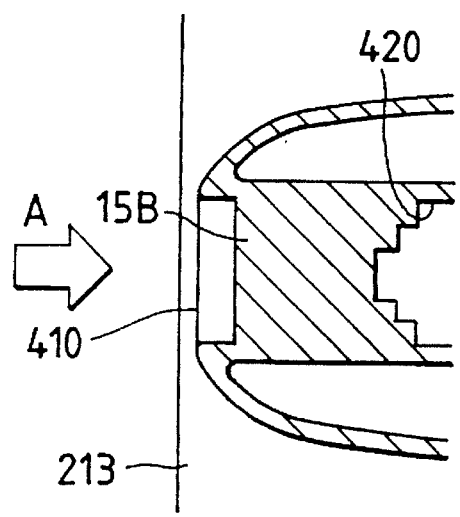
FIG. 6 is a sectional view of a portion of a flow meter according to a third embodiment of this invention.

FIG. 6 shows a third embodiment of this invention which is similar to the embodiment of FIGS. 1–3 except that the partition arrangement 15 of FIGS. 1 and 2 is modified into a partition arrangement 15B.

The downstream edge of each of partition plates in the partition arrangement 15B has two steps. An outer portion of each partition plate is greater in axial length (axial dimension) than an intermediate portion thereof. The intermediate portion of each partition plate is greater in axial length (axial dimension) than an inner portion thereof.

Fourth Embodiment

Figure 7:
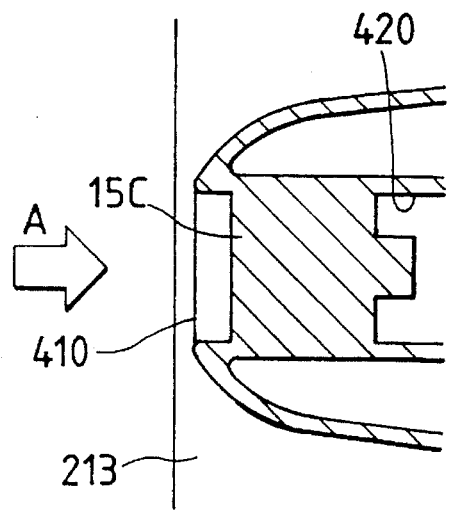
FIG. 7 is a sectional view of a portion of a flow meter according to a fourth embodiment of this invention.

FIG. 7 shows a fourth embodiment of this invention which is similar to the embodiment of FIGS. 1–3 except that the partition arrangement 15 of FIGS. 1 and 2 is modified into a partition arrangement 15C.

Downstream edges of partition plates in the partition arrangement 15C have stepped configurations. An outer portion of each partition plate is smaller in axial length (axial dimension) than an inner portion thereof.

What is claimed is:

1. A flow meter comprising:

a tubular member having a main passage in which fluid flows;

a branch passage member disposed in said main passage and having a branch passage in which the fluid flows;

a support member connecting said branch passage member and a wall of said tubular member, and supporting said branch passage member within said main passage;

a partition arrangement disposed in said branch passage and dividing said branch passage into a plurality of sub passages extending along a flow of the fluid, said sub passages converging at a meeting position downstream of said partition arrangement;

a flow-rate measuring resistor disposed in a region of said branch passage downstream of said partition arrangement and also downstream of said meeting position for sensing a rate of a flow of the fluid in said branch passage;

a control circuit electrically connected to said flow-rate measuring resistor for calculating a measurement value from an output signal of said flow-rate measuring resistor; and an outlet formed in said branch passage member for connecting said branch passage with said main passage to enable the fluid to move from said branch passage into said main passage after the fluid meets said flow-rate measuring resistor;

wherein said partition arrangement comprises a partition plate, and a length of a part of said partition plate, measured along a direction of the fluid flow, depends on a position of said part.

2. The flow meter of claim 1, wherein said partition plate has a downstream end formed with a step, a projecting portion, and a recessed portion.

3. The flow meter of claim 2, wherein said projecting portion and said recessed portion are of a rectangular wave shape.

4. The flow meter of claim 1, wherein a cross-section of said partition plate, taken along a flat plane parallel to the direction of the fluid flow, has a streamline shape.

5. A hot-wire air flow meter for measuring a rate of an air flow in an air passage, comprising:

means for dividing the air passage into a main passage and a sub passage;

a partition arrangement disposed in said sub passage and dividing said sub passage into a plurality of passages which converge at a meeting position downstream of said partition arrangement; and a hot-wire sensor disposed in a region of said sub passage downstream of said partition arrangement and also downstream of said meeting position;

wherein said partition arrangement comprises a partition plate, and a length of a part of said partition plate, measured along a direction of the fluid flow, varies as said part moves from an outer portion of said sub passage toward a center of said sub passage.

6. The hot-wire air flow meter of claim 5, wherein said partition plate has a downstream end formed with a step.

7. A flow meter comprising:
- a tubular member having a main passage in which fluid flows at a given flow rate;
- a branch passage member disposed in said main passage and having a branch passage in which the fluid flows at a branch flow rate corresponding to a part of said given flow rate;
- a support member connecting said branch passage member and a wall of said tubular member, and supporting said branch passage member within said main passage;
- a partition arrangement disposed in said branch passage and dividing said branch passage into a plurality of sub passages extending along a flow of the fluid, said sub passages converging at a meeting position downstream of said partition arrangement;
- a flow-rate measuring resistor disposed in a region of said branch passage downstream of said partition arrangement and also downstream of said meeting position for sensing said branch flow rate;
- a control circuit electrically connected to said flow-rate measuring resistor for calculating said given flow rate based on said branch flow rate sensed by the flow-rate measuring resistor; and
- an outlet formed in said branch passage member for connecting the branch passage with said main passage to enable the fluid to move from said branch passage into said main passage after the fluid meets said flow-rate measuring resistor;
- wherein said partition arrangement comprises a partition plate, and a length of a part of said partition plate, measured along a direction of the fluid flow, depends on a position of said part.

* * * * *